Patented July 5, 1938

2,122,787

UNITED STATES PATENT OFFICE 2,122,787

TREATMENT OF PARAFFIN HYDROCARBONS

Hans Tropsch, Chicago, Ill., assignor to Universal Oil Products Company, Chicago, Ill., a corporation of Delaware No Drawing. Application January 25, 1935, Serial No. 3,474. Renewed January 14, 1937

15 Claims. (Cl. 260—170)

This invention relates to the treatment of paraffin hydrocarbons which are normally gaseous including ethane, propane and the butanes.

In a more specific sense the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casing head gases and this supply is further augmented by the gases produced in cracking oils for the production of gasoline although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives on account of the unreactive character of its components in comparison with their olefinic counterparts.

In one specific embodiment the present invention comprises the dehydrogenation of gaseous paraffin hydrocarbons at elevated temperatures in the presence of catalysts comprising essentially magnesium oxide supporting minor amounts of chromates and/or dichromates of lead, zinc, magnesium, cadmium, iron, nickel, cobalt and alkali metals and other chromates, for instance thorium chromate, along with still smaller proportions of selected sulfates, nitrates, acetates and other salts of these same metals and preferably those of zinc, copper and aluminum.

In the present instance the catalyst mixtures which are preferred for selectively dehydrogenating the lower boiling paraffinic hydrocarbons have been evolved as the result of a large number of experiments with catalysts having a dehydrogenating action upon various types of hydrocarbons such as are encountered in the fractions produced in the distillation of petroleum and other naturally occurring hydrocarbon oil mixtures. The criterion of an acceptable dehydrogenating catalyst is that it shall split off hydrogen without inducing either carbon separation or scission of the bonds between carbon atoms. In the concept of the present invention, catalyst mixtures comprising major amounts of magnesium oxide and minor amounts of the promoting salts as generally designated in the preceding paragraph, have been found to be particularly valuable and efficient.

A considerable number of alternative catalysts fall within the scope of the present invention. In any case each combination will exert its own particular influence upon the dehydrogenating reactions which will not be identical with that of other alternative materials of varying composition. Catalysts of the present character may be considered as magnesium oxide containing chromates as the essential promoting catalysts, the value of which are accentuated by further additions of other salts of the character indicated. Later examples will show the results obtained with different combinations of this general character. The alternative combinations mentioned excludes salts of the halogen acids which as a rule have not been found to produce good promoting effects.

The mineral magnesite from which magnesium oxide is conveniently prepared to furnish base material for the present type of catalysts is most commonly encountered in a massive or earthy variety and rarely in crystal form, the crystals being usually rhombohedral. In many magnesites, the magnesium oxide may be replaced to the extent of several percent by ferrous oxide. The mineral is of quite common occurrence and readily obtainable in quantity at a reasonable figure. The pure compound begins to decompose to form the oxide at a temperature of 350° C. (663° F.), though the rate of decomposition only reaches a practical value at considerably higher temperatures, usually of the order of 800° C. (1472° F.) to 900° C. (1652° F.) This mineral is related to dolomite, the mixed carbonate of calcium and magnesium, this later mineral, however, not being of as good service as the relatively pure magnesite in the present instance. Magnesium carbonate prepared by precipitation or other chemical methods may be used alternatively, in place of the natural mineral, this permitting its use as the active constituent of masses containing spacing materials of relatively inert character and in some cases allowing the production of catalysts of higher efficiency and longer life.

To prepare the magnesium oxide for use as base material for preparing catalysts for the process, the corresponding carbonate obtained either from natural sources or by precipitation reactions is preferably heated for variable periods of time at temperatures in the neighborhood of 800° C. (1472° F.) which insures the decomposition of most of the carbonate to oxide. The conditions of time and temperature employed in calcining any particular carbonate mineral will depend, to a large extent, upon its physical and, to a smaller extent, upon its chemical composition. Magnesite may contain at times several per cent of ferrous oxide in isomorphous mixture with magnesium oxide and since it occurs in nature in a harder and more compact variety than the precipitated carbonate, it may require for both reasons different conditions of time and temperature to reduce substantially all of it to the desired oxide.

The mineral oxide of magnesium may sometimes be employed (this oxide being known as periclase) whenever the same is readily available and its physical properties as well as its content of impurities permits. The mineral oxide occurs in granular form or in definite cubic or octahedral crystals and may contain in many cases besides relatively inert siliceous gangue materials small amounts of iron and manganese replacing a portion of the magnesium.

The deposition of the promoting oxide may be effected in a number of ways, any one of which is comprised within the scope of the invention. Thus, for example, lead chromate may be deposited upon magnesium oxide by stirring the magnesite in an aqueous solution of potassium chromate or dichromate and thereafter impregnating in a solution of lead acetate. For the further addition of salts it may suffice to heat the filtered and washed particles containing chromate with other salt solutions such as, for example, a fairly concentrated solution of zinc sulfate, during which step some of the dissolved salt is occluded, after which the magnesite particles are again filtered and washed. The oxide containing the desired amounts of promoting substance is then dried at a moderate temperature to produce the final catalyst.

In lieu of the foregoing procedure the incorporation of the necessary promoters may be effected by successive additions of relatively concentrated solutions of the required promoting salts to solid magnesium oxide until a paste of uniform consistency is obtained, after which the water is evaporated to leave the salts deposited upon the magnesium oxide. Thus the process of addition comprises only well known procedures in the chemical art and may be varied to suit the needs of any particular combination which has proven valuable in catalytic reforming operations.

In regard to the relative proportions of magnesium oxide and promoting materials it may be stated in general that the latter are generally less than 10% by weight of the total composites. The effect upon the catalytic activity of the magnesium oxide caused by varying the percentage of any given compound or mixture of compounds deposited thereon is not a matter for exact calculation but more one for determination by experiment. Frequently good increases in catalytic effectiveness are obtainable by the deposition of as low as 1 or 2% of a promoting salt upon the surface and in the pores of the oxide, though the general average is about 5%.

In practicing the dehydrogenation of paraffinic gases according to the present process a solid composite catalyst prepared according to the foregoing alternative methods is used as a filler in a reaction tube or chamber in the form of particles of graded size or small pellets and the gas to be dehydrogenated is passed through the catalyst after being heated to the proper temperature, usually within the range of from 400 to 750° C. (752–1382° F.) The most commonly used temperatures are around 500° C. (900° F. to 1000° F.). The catalyst tube may be heated exteriorly if desired to maintain the proper reaction temperature. The pressure employed may be atmospheric or slightly superatmospheric of the order of from 50 to 100 pounds per square inch, though any large amount of pressure has a tendency to depress the dehydrogenation reactions disproportionately to the increase in capacity of the plant. The time during which the gases are exposed to dehydrogenating conditions in the presence of the preferred catalyst is comparatively short, always below 20 seconds and frequently as low as from 4–8 seconds.

The exit gases from the tube or chamber may be passed through selective absorbents to combine with or absorb the olefin or olefin mixture produced or the olefins may be selectively polymerized by suitable catalysts, caused to alkylate other hydrocarbons such as aromatics or treated directly with chemical reagents to produce desirable and commercially valuable derivatives. After the olefins have been removed the residual gases may be recycled for further dehydrogenating treatment with or without removal of hydrogen.

Members of the present group of catalysts are selective in removing two hydrogen atoms from a paraffin molecule to produce the corresponding olefin without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without loss of porosity or catalyzing efficiency.

The results of numerous typical runs could be introduced to indicate the general applicability of the present types of catalysts in dehydrogenating paraffins, but the following examples are sufficiently characteristic, though the scope of the invention is not limited to correspond with the numerical data.

*Example I*

The preparation of the catalyst was as follows: 50 parts by weight of magnesite burned one hour at 800° C. (1472° F.) and screened to 8–10 mesh was treated with 100 parts of a 1% solution of chromic acid. The magnesium oxide impregnated with the chromic acid was then dried and thereafter treated with 100 parts of a solution containing 1% of cobaltous nitrate, 1% of lead acetate and 1% of zinc acetate at 25° C. (77° F.) for one half hour. The impregnated catalyst was then dried without further washing. Isobutane was passed through a treating tower containing the pellets of magnesite as filler at atmospheric pressure and temperatures of about 600° C., (1112° F.) with a space velocity of from 50 to 70 per hour.

The following table shows the nature of the results obtained by means of gas analyses taken at indicated times from the start of the run.

*Composition of dehydrogenated gases*

| Time after start, hours | 40 | 80 | 150 | 250 |
|---|---|---|---|---|
| i-Butylene, percent | 24.6 | 23.5 | 24.6 | 24.6 |
| Other butylenes and propylene, percent | 6.3 | 5.2 | 5.4 | 5.9 |
| Ethylene, percent | 2.2 | 2.3 | 4.6 | 2.1 |
| Paraffins (mainly i-butane), percent | 35.0 | 37.1 | 35.4 | 38.4 |
| Hydrogen, percent | 31.9 | 31.9 | 30.0 | 29.0 |

From the above data it will be seen that the dehydrogenation corresponds closely to the calculated equilibrium mixture at 600° C., (1112° F.) which should contain approximately 33% hydrogen, 33% butane and 33% butylenes. Substantially 50% of the original isobutane was converted into olefins and hydrogen.

It is to be further observed that the catalytic activity was maintained substantially constant for the period of a run of approximately 10 days.

*Example II*

The catalyst used in this case consisted of granulated magnesium oxide supporting lead chromate and ferric sulfate. To make the catalyst, 75 parts by weight of a previously prepared material containing lead chromate was added to 150 parts of a 1% ferric sulfate solution, in which it was stirred for about ½ hour at 50° C. The catalyst particles were then filtered from the solution and dried at 300° C. (572° F.).

Using small pellets of the above oxide mixture n-butane was passed through a treating tower containing the pellets as filler at atmospheric pressure and temperatures of about 600° C., (1112° F.) with a space velocity of from 45 to 55 per hour.

The following table shows the nature of the results obtained by means of gas analyses taken at indicated times from the start of the run.

*Composition of dehydrogenated gases*

| Time after start, hours | 40 | 60 | 80 | 120 |
|---|---|---|---|---|
| n-Butane, percent | 18.6 | 18.3 | 17.5 | 16.0 |
| Propylene, percent | 12.3 | 11.4 | 9.8 | 9.3 |
| Ethylene, percent | 2.3 | 2.4 | 4.7 | 2.2 |
| Paraffins (mainly n-butane), percent | 41.0 | 42.9 | 43.7 | 50.1 |
| Hydrogen, percent | 25.8 | 25.0 | 24.3 | 22.4 |

It is again observable that the catalytic activity was maintained substantially constant for a period of a run which was in this case 5 days.

*Example III*

A catalyst was prepared which contained magnesium chromate and zinc sulfate supported on magnesium oxide by the following method. 45 parts by weight of magnesium nitrate, an equal weight of magnesium chromate and 10 parts by weight of zinc sulfate were separately dissolved in small amounts of water, the solutions mixed and the composite evaporated to dryness. The dry powder was heated at 250° C. (482° F.) for several hours and finally at 500° C. (932° F.) for one hour. The material was then ground and sized to conserve particles of from 6-10 mesh diameter.

Using small pellets of the above oxide mixture made by moistening and compressing and later drying as in the previous examples, propane was passed through a treating tower containing the pellets as filler atmospheric pressure and temperatures of about 600° C., (1112° F.) with a space velocity of from 40 to 45 per hour.

The following table shows the nature of the results obtained by means of gas analyses taken at the same indicated times from the start of the run.

*Composition of dehydrogenated gases*

| Time after start, hours | 40 | 60 | 80 | 120 |
|---|---|---|---|---|
| Propane, percent | 15.0 | 14.8 | 14.0 | 13.9 |
| Ethylene, percent | 3.2 | 3.3 | 5.6 | 3.1 |
| Paraffins (mainly propane), percent | 64.6 | 64.9 | 63.9 | 67.1 |
| Hydrogen, percent | 17.2 | 17.0 | 16.5 | 15.9 |

There was substantially no change in the catalytic activity of the catalyst used over a period of 6 days of continuous operation.

The foregoing specification and examples are sufficient to show that the invention has intrinsic value when practiced in the art, but neither section is to be construed as imposing limitations upon the scope of the invention, as both are given for illustrative purposes only.

I claim as my invention:

1. A process for converting normally gaseous paraffins into olefins which comprises dehydrogenating the same in the presence of magnesium oxide admixed with minor proportions of a chromate and a metal salt of an oxygen-containing acid selected from the group consisting of sulphuric, nitric and acetic acids.

2. A process for converting normally gaseous paraffins into olefins which comprises dehydrogenating the same in the presence of magnesium oxide admixed with minor proportions of a chromate and a metal sulphate.

3. A process for converting normally gaseous paraffins into olefins which comprises dehydrogenating the same in the presence of magnesium oxide admixed with minor proportions of a chromate and a metal nitrate.

4. A process for converting normally gaseous paraffins into olefins which comprises dehydrogenating the same in the presence of magnesium oxide admixed with minor proportions of a chromate and a metal acetate.

5. A process for converting normally gaseous paraffins into olefins which comprises dehydrogenating the same in the presence of magnesium oxide admixed with minor proportions of lead chromate and zinc sulphate.

6. A catalyst suitable for use in the dehydrogenation of hydrocarbons comprising a major proportion of magnesium oxide admixed with minor proportions of a chromate and a metal salt of an oxygen-containing acid selected from the group consisting of sulphuric, nitric and acetic acids.

7. A catalyst suitable for use in the dehydrogenation of hydrocarbons comprising a major proportion of magnesium oxide admixed with minor proportions of a chromate and a metal sulphate.

8. A catalyst suitable for use in the dehydrogenation of hydrocarbons comprising a major proportion of magnesium oxide admixed with minor proportions of a chromate and a metal nitrate.

9. A catalyst suitable for use in the dehydrogenation of hydrocarbons comprising a major proportion of magnesium oxide admixed with minor proportions of a chromate and a metal acetate.

10. A process for converting normally gaseous paraffins into olefins which comprises dehydrogenating the same in the presence of a catalytic mixture of a major proportion of magnesium oxide and a minor proportion of lead chromate.

11. A process for converting normally gaseous paraffins into olefins which comprises dehydrogenating the same in the presence of magnesium oxide admixed with less than 10% by weight of lead chromate.

12. A process for dehydrogenating hydrocarbons which comprises subjecting the hydrocarbons under dehydrogenating conditions to the action of a magnesium oxide catalyst containing lead chromate in relatively small but sufficient amount to promote the catalytic activity of the magnesium oxide.

13. A process for dehydrogenating hydrocarbons which comprises subjecting the hydrocarbons to dehydrogenating conditions in the presence of a magnesium oxide catalyst containing a chromate in relatively small but sufficient amount to promote the catalytic activity of the oxide.

14. A process for dehydrogenating hydrocarbons which comprises subjecting the hydrocarbons to dehydrogenating conditions in the presence of a magnesium oxide catalyst, said catalyst further containing a relatively small amount of a metallic oxygen-containing salt selected from the group consisting of the sulfates, nitrates and acetates of zinc, copper and aluminum.

15. The process as defined in claim 13 further characterized in that said catalyst also contains a relatively small amount of a metallic oxygen-containing salt selected from the group consisting of the sulfates, nitrates and acetates of zinc, copper and aluminum.

HANS TROPSCH.